US012601409B2

(12) United States Patent
Lee et al.

(10) Patent No.: US 12,601,409 B2
(45) Date of Patent: Apr. 14, 2026

(54) GAS EXHAUST APPARATUS AND INTAKE LINE AUTOMATIC CLOSING APPARATUS USED FOR GAS EXHAUST APPARATUS

(71) Applicant: SEMES CO., LTD., Cheonan-si (KR)

(72) Inventors: Jehyoung Lee, Cheonan-si (KR); Joon Hwan Jang, Cheonan-si (KR); Shi Hyun Park, Pyeongtaek-si (KR); Inhwang Park, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 484 days.

(21) Appl. No.: 18/091,633

(22) Filed: Dec. 30, 2022

(65) Prior Publication Data

US 2023/0268199 A1 Aug. 24, 2023

(30) Foreign Application Priority Data

Feb. 21, 2022 (KR) ........................ 10-2022-0022504

(51) Int. Cl.
F16K 11/04 (2006.01)
B01F 23/10 (2022.01)

(52) U.S. Cl.
CPC ............ F16K 11/04 (2013.01); B01F 23/191 (2022.01); *Y10T 137/87676* (2015.04)

(58) Field of Classification Search
CPC ............ C23C 16/4408; C23C 16/4409; C23C 16/4412; F16K 15/182; F16K 11/04; G05D 16/024; H01J 37/32834; H01J 37/32899; H01L 21/67017; H01L 21/67253; Y10T 137/87652; Y10T 137/87676; Y10T 137/86002; Y10T 137/86027; Y10T 137/87917; B01F 23/191

USPC ..... 137/111, 112, 113, 512, 513, 526, 527.8, 137/543.19, 543.23, 565.14, 565.15, 137/565.16, 614.2, 896, 897, 898, 605, 137/565.13, 613; 156/345.28; 251/69, 251/72

See application file for complete search history.

(56) References Cited

U.S. PATENT DOCUMENTS

| | | | | |
|---|---|---|---|---|
| 1,185,081 | A | * | 5/1916 | Fisher ..................... F23N 3/045 137/896 |
| 1,925,464 | A | * | 9/1933 | Schoene ............... F16K 15/066 137/516.13 |

(Continued)

FOREIGN PATENT DOCUMENTS

| | | |
|---|---|---|
| KR | 10-2002-0039105 | 5/2002 |
| KR | 20-0297592 | 12/2002 |

(Continued)

OTHER PUBLICATIONS

Office Action from the Korean Intellectual Property Office dated Sep. 13, 2023.

*Primary Examiner* — Kenneth Rinehart
*Assistant Examiner* — Jonathan J Waddy

(57) ABSTRACT

Provided is a gas exhaust apparatus for expelling a gas in a treatment space of a wafer treatment apparatus to outside, the gas exhaust apparatus including a main exhaust line connected to the treatment space, and an auxiliary exhaust line having an end connected to the main exhaust line to supply an external air current to the main exhaust line, wherein an automatic closer is disposed at another end of the auxiliary exhaust line to close the other end of the auxiliary exhaust line in a specific situation.

15 Claims, 12 Drawing Sheets

(56)          References Cited

U.S. PATENT DOCUMENTS

| | | | | | |
|---|---|---|---|---|---|
| 2,538,335 | A | * | 1/1951 | Shields | F16K 35/14 |
| | | | | | 137/317 |
| 3,633,602 | A | * | 1/1972 | Schossow | B01F 23/10 |
| | | | | | 137/625.41 |
| 3,941,151 | A | * | 3/1976 | Biddle | F16K 24/06 |
| | | | | | 137/527.6 |
| 4,369,809 | A | * | 1/1983 | Euerle | F16K 15/063 |
| | | | | | 137/543.19 |
| 5,178,185 | A | * | 1/1993 | Stehling | F16K 15/18 |
| | | | | | 251/285 |
| 5,250,092 | A | * | 10/1993 | Nakano | C23C 16/4412 |
| | | | | | 96/136 |
| 6,202,653 | B1 | * | 3/2001 | Harada | C23C 16/4486 |
| | | | | | 134/22.12 |
| 8,272,524 | B2 | * | 9/2012 | Alajlani | B65D 88/38 |
| | | | | | 220/203.23 |

| | | | | | |
|---|---|---|---|---|---|
| 2001/0010365 | A1 | * | 8/2001 | Iwabuchi | F16K 41/10 |
| | | | | | 251/64 |
| 2002/0108659 | A1 | * | 8/2002 | Horvath | F16K 15/03 |
| | | | | | 137/614.2 |
| 2004/0250765 | A1 | * | 12/2004 | Ishizaka | C23C 16/34 |
| | | | | | 118/712 |
| 2006/0121211 | A1 | * | 6/2006 | Choi | C23C 16/455 |
| | | | | | 427/248.1 |
| 2015/0093909 | A1 | * | 4/2015 | Murata | C23C 16/45593 |
| | | | | | 438/758 |

FOREIGN PATENT DOCUMENTS

| | | |
|---|---|---|
| KR | 10-0788506 | 12/2007 |
| KR | 10-0796816 | 1/2008 |
| KR | 10-0961873 | 6/2010 |
| KR | 10-2010-0085783 | 7/2010 |
| KR | 10-1201817 | 9/2012 |
| KR | 10-2008310 | 8/2019 |

* cited by examiner

500'

GAS EXHAUST APPARATUS AND INTAKE LINE AUTOMATIC CLOSING APPARATUS USED FOR GAS EXHAUST APPARATUS

CROSS-REFERENCE TO RELATED PATENT APPLICATION

This application claims the benefit of Korean Patent Application No. 10-2022-0022504, filed on Feb. 21, 2022, in the Korean Intellectual Property Office, the disclosure of which is incorporated herein in its entirety by reference.

BACKGROUND OF THE INVENTION

1. Field of the Invention

The present invention relates to a semiconductor apparatus and, more particularly, to a gas exhaust apparatus and an intake line automatic closing apparatus.

2. Description of the Related Art

Various processes such as photolithography, etching, ashing, ion injection, deposition, and cleaning are performed on a wafer to manufacture semiconductor devices, and various wafer treatment apparatuses are used for such processes. Circuit patterns are getting finer and denser due to the increase in performance of semiconductor devices, and contaminants such as particulates, organic substances, and metals remaining on the wafer surface may exert a significant effect on the characteristics and production yield of semiconductor devices.

As such, a process space of the wafer treatment apparatus needs to be maintained in a constant process atmosphere. The process atmosphere is controlled to be maintained at a preset pressure by a gas exhaust apparatus. The gas exhaust apparatus may not only control the process atmosphere to be constant by controlling expulsion of gases from the process space, but also expel process byproducts produced during wafer treatment. For example, process byproducts such as fumes may be produced during a cleaning process for removing various process materials and contaminants from the wafer surface. As another example, organic substances may volatilize to produce process byproducts during a heat treatment process on the wafer.

The gas exhaust apparatus is connected to the wafer treatment apparatus to expel gases from the wafer treatment apparatus, and normally includes additional intake lines for receiving air currents from outside the wafer treatment apparatus to control air currents of exhaust lines. In general, a pump connected to an end of the gas exhaust apparatus creates a suction pressure, and thus air currents in the intake lines are formed only in a direction in which external air is introduced. However, in an emergency situation in which, for example, the pump may not create the suction pressure or the apparatus stops operating, gases remaining in the exhaust lines may leak in a backward direction through the intake lines. The gases remaining in the exhaust lines include fumes, toxic gases, particulates, etc., and thus are required not to leak outside the wafer treatment apparatus.

SUMMARY OF THE INVENTION

The present invention provides a gas exhaust apparatus and an intake line automatic closing apparatus capable of preventing leakage of process byproduct gases through intake ports when an emergency situation occurs.

The present invention also provides a gas exhaust apparatus and an intake line automatic closing apparatus capable of automatically closing intake lines without additional control when an emergency situation occurs.

The present invention also provides a gas exhaust apparatus and an intake line automatic closing apparatus capable of protecting systems and users outside a wafer treatment apparatus by preventing leakage of process byproduct gases.

However, the scope of the present invention is not limited thereto.

According to an aspect of the present invention, there is provided a gas exhaust apparatus for expelling a gas in a treatment space of a wafer treatment apparatus to outside, the gas exhaust apparatus including a main exhaust line connected to the treatment space, and an auxiliary exhaust line having an end connected to the main exhaust line to supply an external air current to the main exhaust line, wherein an automatic closer is disposed at another end of the auxiliary exhaust line to close the other end of the auxiliary exhaust line in a specific situation.

The specific situation may include a situation in which the gas to be expelled through the main exhaust line to the outside leaks through the other end of the auxiliary exhaust line.

The automatic closer may include a body connected to the auxiliary exhaust line and having an opening, a sealer connected onto the body and having a hollow part, a cover mounted to be vertically movable on the sealer to open or close the opening, and a driver connected to the cover to vertically drive the cover.

The automatic closer may include a plurality of bodies, and the sealer may be provided on the plurality of bodies to integrally connect the plurality of bodies.

The cover may be provided to simultaneously open or close the openings of the plurality of bodies.

One driver may be connected to the cover.

An O-ring groove may be provided in a side surface of the sealer facing the cover.

The opening and the hollow part may be connected to each other.

The driver may include a driving shaft connected to the cover to vertically drive the cover, and support shafts mounted on the sealer to pass through support holes of the cover.

The specific situation may include a situation in which power supply is cut off and, in the specific situation, the cover may fall by its own weight to close the opening.

An external air sensor for sensing an amount of an external air current introduced into the auxiliary exhaust line may be mounted on the auxiliary exhaust line.

When the amount of the external air current introduced into the auxiliary exhaust line, which is sensed by the external air sensor, is zero or less than a preset amount, the cover may close the opening.

An air current controller for controlling an amount of an air current flowing through the auxiliary exhaust line may be mounted in the auxiliary exhaust line.

A mass may be connected to the air current controller and, in the specific situation, the air current controller may be oriented to block the auxiliary exhaust line by a weight of the mass.

According to another aspect of the present invention, there is provided an automatic closing apparatus for closing an intake line in a specific situation, the automatic closing apparatus includes a body connected to the intake line and having an opening, a sealer connected onto the body, a cover mounted to be vertically movable on the sealer to open or close the opening, and a driver connected to the cover to vertically drive the cover.

The automatic closing apparatus may include a plurality of bodies, the sealer may be provided on the plurality of bodies to integrally connect the plurality of bodies, and the cover may be provided to simultaneously open or close the openings of the plurality of bodies.

One driver may be connected to the cover.

An O-ring groove may be provided in a side surface of the sealer facing the cover.

The driver may include a driving shaft connected to the cover to vertically drive the cover, and support shafts mounted on the sealer to pass through support holes of the cover.

The specific situation may include a situation in which power supply is cut off and, in the specific situation, the cover may fall by its own weight to close the opening.

According to another aspect of the present invention, there is provided a gas exhaust apparatus for expelling a gas in a treatment space of a wafer treatment apparatus to outside, the gas exhaust apparatus including a main exhaust line connected to the treatment space, and an auxiliary exhaust line having an end connected to the main exhaust line to supply an external air current to the main exhaust line, wherein an automatic closer is disposed at another end of the auxiliary exhaust line and includes a body connected to the auxiliary exhaust line and having an opening, a sealer connected onto the body and having a hollow part, a cover mounted to be vertically movable on the sealer to open or close the opening, and a driver connected to the cover to vertically drive the cover, and wherein, in a situation in which power supply is cut off, to prevent the gas to be expelled through the main exhaust line to the outside from leaking through the other end of the auxiliary exhaust line, the cover falls by its own weight to close the opening so as to close the other end of the auxiliary exhaust line.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
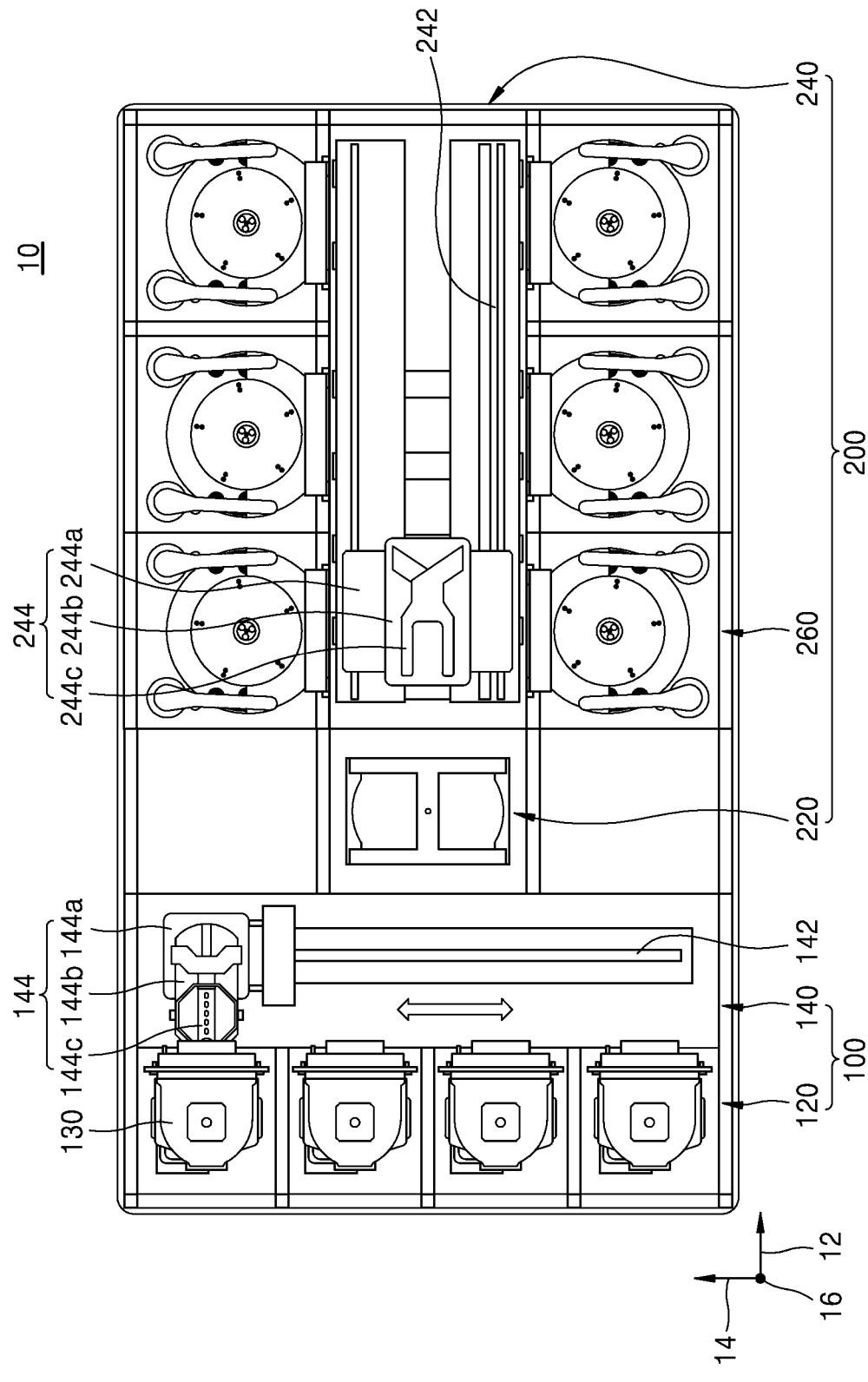
FIG. 1 is a plan view of a wafer treatment system according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity or convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

FIG. 1 is a plan view of a wafer treatment system 10 according to an embodiment of the present invention.

Referring to FIG. 1, the wafer treatment system 10 includes an index module 100 and a process treatment module 200. The index module 100 includes load ports 120 and a transport frame 140. The load ports 120, the transport frame 140, and the process treatment module 200 may be sequentially arranged. Herein, a direction in which the load ports 120, the transport frame 140, and the process treatment module 200 are arranged is referred to as a first direction 12 (or an x-axis direction), a direction perpendicular to the first direction 12 when viewed from above is referred to as a second direction 14 (or an y-axis direction), and a direction perpendicular to a plane including the first and second directions 12 and 14 (i.e., an xy plane) is referred to as a third direction 16 (or a z-axis direction).

Carriers 130 containing wafers W are seated on the load ports 120. A plurality of load ports 120 may be disposed along the second direction 14. The number of load ports 120 may increase or decrease depending on process efficiency of the process treatment module 200, production efficiency, or the like. Each carrier 130 may use a front opening unified pod (FOUP) and include slots for holding a plurality of wafers W horizontally.

The process treatment module 200 includes a buffer unit 220, a transport chamber 240, and process chambers 260. The transport chamber 240 may extend in parallel with the first direction 12, and the process chambers 260 may be disposed at both sides in a lengthwise direction of the transport chamber 240. Some of the process chambers 260 may be stacked on one another. Meanwhile, the process chambers 260 may be disposed only at one side of the transport chamber 240.

The buffer unit 220 is disposed between the transport frame 140 and the transport chamber 240 to provide a space where the wafers W stay before being transported between the transport frame 140 and the transport chamber 240. The buffer unit 220 includes slots where the wafers W are disposed. The buffer unit 220 may be provided to be open or openable to the transport frame 140 and the transport chamber 240.

The transport frame 140 may transport the wafers W between the carriers 130 and the buffer unit 220. The transport frame 140 is provided with an index rail 142 and an index robot 144. The index rail 142 may extend in parallel with the second direction 14, and the index robot 144 may be mounted thereon to move along the second direction 14. The index robot 144 includes a base 144*a*, a body 144*b*, and an index arm 144*c*. The base 144*a* is provided to be movable along the index rail 142. The body 144*b* is coupled to the base 144*a*, and is provided to be rotatable and movable along the third direction 16 on the base 144*a*. The index arm 144*c* is coupled to the body 144*b*, and is provided to be movable away from or toward the body 144*b*. A plurality of index arms 144*c* may be provided and individually driven. Each index arm 144*c* may be used to transport the wafer W from the carrier 130 to the process treatment module 200, or from the process treatment module 200 to the carrier 130.

The transport chamber 240 transports the wafers W between the buffer unit 220 and the process chambers 260 or between the process chambers 260. The transport chamber 240 is provided with a guide rail 242 and a main robot 244. The guide rail 242 may extend in parallel with the first direction 12, and the main robot 244 may be mounted thereon to move along the first direction 12. The main robot 244 includes a base 244*a*, a body 244*b*, and a main arm 244*c*. The base 244*a* is provided to be movable along the guide rail 242. The body 244*b* is coupled to the base 244*a*, and is provided to be rotatable and movable along the third direction 16 on the base 244*a*. The main arm 244*c* is coupled to the body 244*b*, and is provided to be movable away from or toward the body 244*b*. A plurality of main arms 244*c* may be provided and individually driven.

Each process chamber 260 is provided with a wafer treatment apparatus 300 or 400 (see FIG. 2 or 3) for performing a process on the wafer W. The wafer treatment apparatus 300 or 400 may have a different structure depending on the performed process. Meanwhile, the wafer treatment apparatuses 300 in all process chambers 260 may have the same structure, or the wafer treatment apparatuses 300 in the process chambers 260 belonging to the same group may have the same structure.

The wafer treatment apparatus 300 (see FIG. 2) may perform a cleaning process to treat the wafer W with a liquid. The wafer treatment apparatus 400 (see FIG. 3) may perform a heating process to heat the wafer W. The wafer treatment apparatuses 300 and 400 are described as a cleaning apparatus and a heating apparatus herein, but are not limited thereto, and it is noted that the wafer treatment apparatus 300 or 400 is also applicable to an etching apparatus, a photolithography apparatus, etc. In addition, it is also noted that a gas exhaust apparatus 500 (see FIG. 4) of the present invention is applicable to various wafer treatment apparatuses 300 and 400 such as a cleaning apparatus and a heating apparatus.

Figure 2:
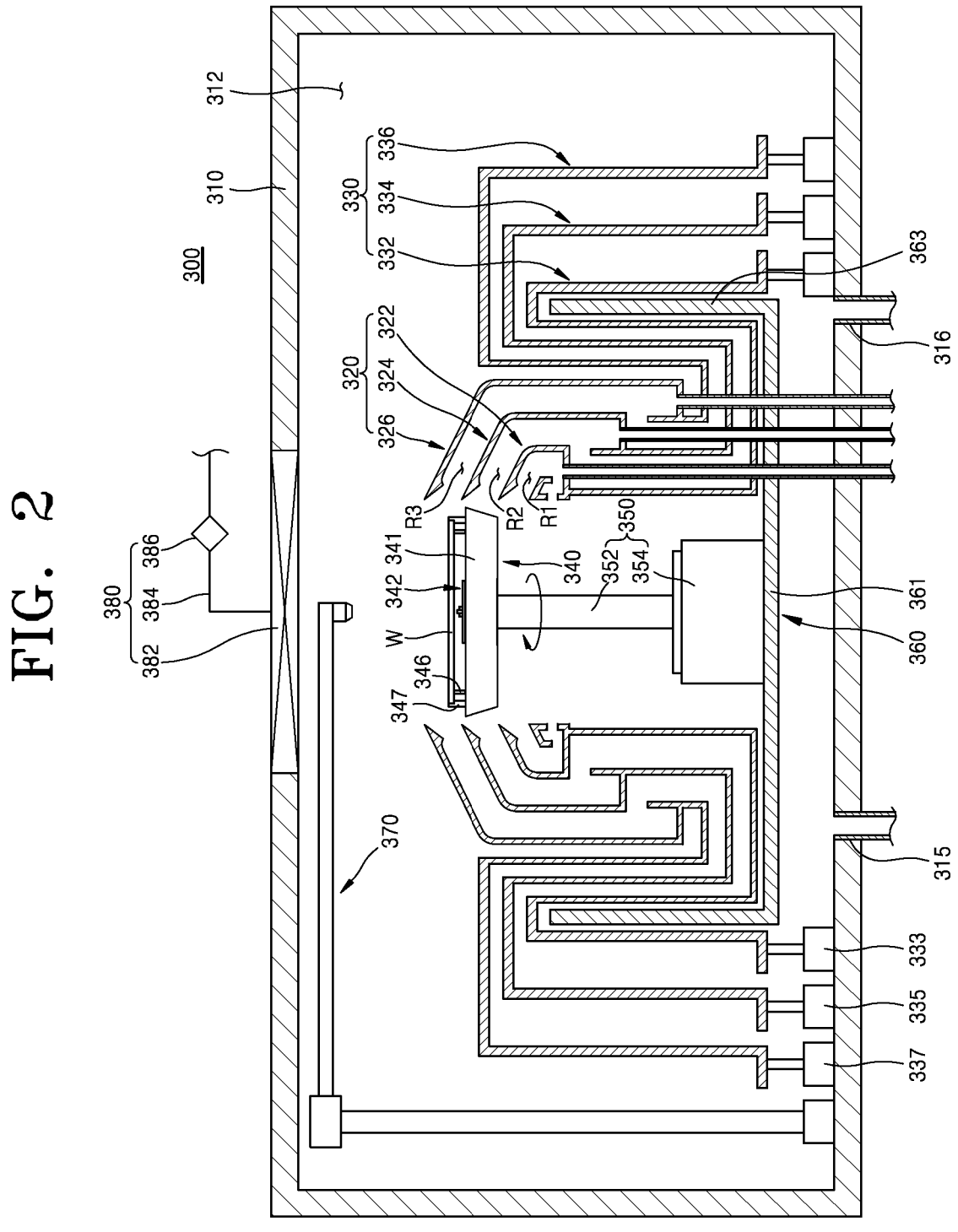
FIG. 2 is a cross-sectional view of a wafer treatment apparatus according to an embodiment of the present invention.

FIG. 2 is a cross-sectional view of the wafer treatment apparatus 300 according to an embodiment of the present invention. The wafer treatment apparatus 300 may be used as an apparatus for cleaning the wafer W.

Referring to FIG. 2, the wafer treatment apparatus 300 includes a housing 310, a treatment chamber 320, lifts 330, a wafer supporter 340, a support driver 350, a base 360, a liquid discharger 370, and an air current supplier 380.

The housing 310 provides an internal space. An opening (not shown) may be provided at a side of the housing 310 and used as a passage for the wafer W. A door (not shown) may be mounted on the opening to open or close the opening. In a wafer treatment process, the opening is closed to seal the internal space of the housing 310. Exhaust ports

315 and 316 may be provided at a side of the housing 310 to expel an air current formed in the housing 310 to the outside.

The treatment chamber 320 provides a space where the wafer treatment process is performed. The treatment chamber 320 has an open top. The treatment chamber 320 includes a plurality of collection barrels 322, 324, and 326. Although three, e.g., first, second, and third, collection barrels 322, 324, and 326 are assumed in an embodiment of the present invention, the number of collection barrels may increase or decrease. The collection barrels 322, 324, and 326 are provided to be spaced apart from each other along a vertical direction (or the third direction 16). The collection barrels 322, 324, and 326 may be vertically stacked on one another. The first, second, and third collection barrels 322, 324, and 326 may collect different treatment liquids used in the process. The treatment chamber 320 provides one or more inflow spaces R1, R2, and R3 formed in a vertical direction (or the third direction 16) to receive the treatment liquids after the wafer treatment.

The first collection barrel 322 may be disposed to surround the wafer supporter 340, the second collection barrel 324 may be disposed to surround the first collection barrel 322, and the third collection barrel 326 may be disposed to surround the second collection barrel 324. The collection barrels 322, 324, and 326 are provided in circular ring shapes. An internal space R1 of the first collection barrel 322, a space R2 between the first and second collection barrels 322 and 324, and a space R3 between the second and third collection barrels 324 and 326 function as the inflow spaces R1, R2, and R3 into which the treatment liquids are introduced. Collection pipes may extend downward from bottom surfaces of the collection barrels 322, 324, and 326 to expel the treatment liquids introduced into the inflow spaces R1, R2, and R3, respectively. The expelled treatment liquids may be reused through an external treatment liquid recycling system (not shown).

The lifts 330 are coupled to the collection barrels 322, 324, and 326 to lift the collection barrels 322, 324, and 326. The first lift 332 is connected to the first collection barrel 322, the second lift 334 is connected to the second collection barrel 324, and the third lift 336 is connected to the third collection barrel 326. The lifts 332, 334, and 336 may be connected to driving units 333, 335, and 337, respectively, to receive a driving force for vertical motion. The lifts 330 may control heights of the collection barrels 322, 324, and 326 to adjust sizes, heights, positions, or the like of the inflow spaces R1, R2, and R3.

The wafer supporter 340 supports and rotates the wafer W in the internal space of the housing 310. The wafer supporter 340 is disposed in an internal space of the treatment chamber 320. The wafer supporter 340 includes a rotating support plate 341 and a fixed support plate 342.

The rotating support plate 341 has an almost circular upper edge when viewed from above. The rotating support plate 341 is positioned in an outer region of the fixed support plate 342. The rotating support plate 341 is rotated by the support driver 350. Support pins 346 and chuck pins 347 are provided on the rotating support plate 341. The fixed support plate 342 has an almost circular upper edge when viewed from above. The fixed support plate 342 is positioned in a central region of the wafer supporter 340.

The support driver 350 may rotate or lift the wafer supporter 340. The support driver 350 is connected to the rotating support plate 341 of the wafer supporter 340. The support driver 350 includes a driving shaft 352 and a driver 354. The driving shaft 352 is rotated by the driver 354 to rotate the rotating support plate 341. In addition, the driving shaft 352 may be moved or stretched in a vertical direction by the driver 354 to adjust a height of the wafer supporter 340.

The base 360 is provided in a cylindrical shape surrounding the treatment chamber 320 and having an open top. The base 360 includes a bottom 361 and a wall 363. The base 360 is provided in a cup shape. The bottom 361 is provided in a disk shape and may be connected to an exhaust port (not shown). The wall 363 extends in a perpendicular direction from an edge of the bottom 361. The base 360 may be made of a resin material having a high acid resistance. The base 360 substantially functions as an outer wall of the entirety of the treatment chamber 320.

The liquid discharger 370 (or a frontside liquid discharger 370) supplies a treatment liquid to the wafer W in the wafer treatment process. The liquid discharger 370 supplies the treatment liquid to a frontside of the wafer W. For example, an organic solvent such as isopropyl alcohol (IPA) may be discharged from the liquid discharger 370 to dry the frontside of the wafer W.

The air current supplier 380 forms a descending air current in the internal space of the housing 310. The air current supplier 380 includes a fan 382, an air current supply line 384, and a filter 386. The fan 382 is mounted at an upper side of the housing 310 to form a descending air current in the internal space of the housing 310. The air current supply line 384 supplies external air into the housing 310. The filter 386 filters impurities included in the air.

The exhaust ports 315 and 316 are connected to the gas exhaust apparatus 500 (see FIG. 4) to be described below. The exhaust ports 315 and 316 are connected to main exhaust lines 510: 511 and 515 of the gas exhaust apparatus 500, respectively. The exhaust ports 315 and 316 of a plurality of wafer treatment apparatuses 300 may be connected to the main exhaust lines 510: 511 and 515 of the gas exhaust apparatus 500, respectively. Although two exhaust ports 315 and 316 are shown in FIG. 3, the number of exhaust ports may increase or decrease depending on liquid types, process byproduct types, or the like and each exhaust port may be connected to the main exhaust line 510 of the gas exhaust apparatus 500.

Figure 3:
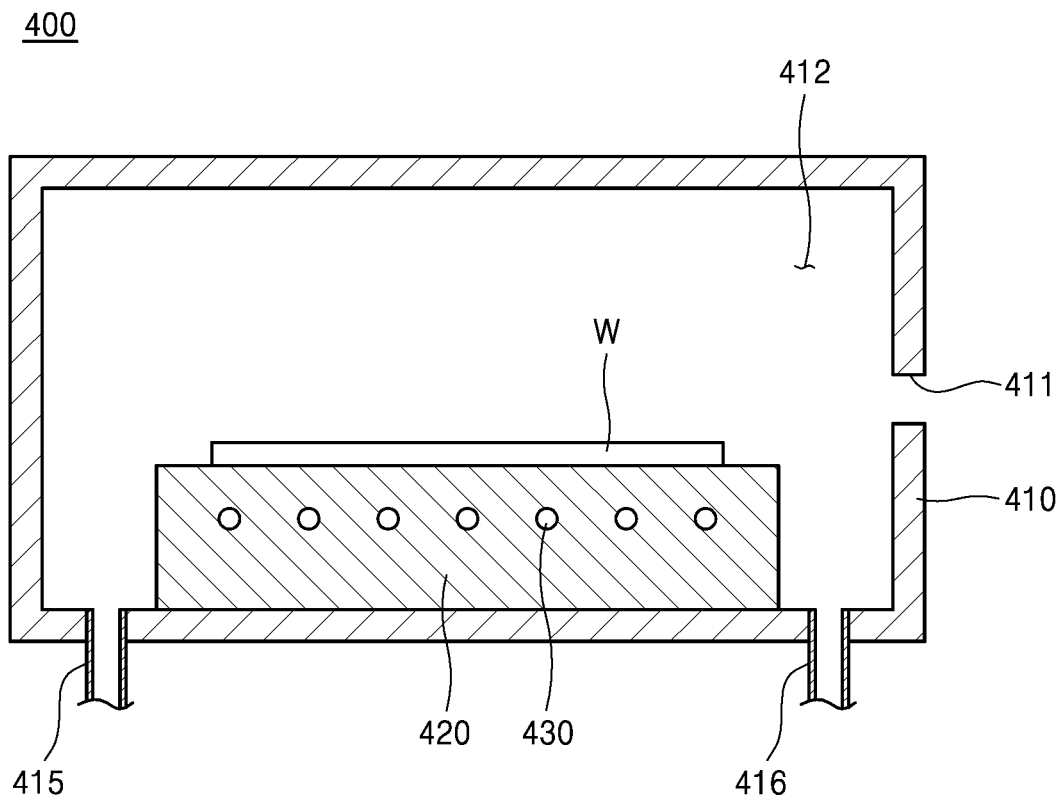
FIG. 3 is a cross-sectional view of a wafer treatment apparatus according to another embodiment of the present invention.

FIG. 3 is a cross-sectional view of the wafer treatment apparatus 400 according to another embodiment of the present invention. The wafer treatment apparatus 400 may be used as an apparatus for heating the wafer W.

Referring to FIG. 3, the wafer treatment apparatus 400 includes a housing 410, a support plate 420, and heaters 430.

The housing 410 provides therein a treatment space 412 where the wafer W is heated. An opening 411 may be provided at a side of the housing 410 and used as a passage for the wafer W. A door (not shown) may be mounted on the opening to open or close the opening. In a wafer treatment process, the opening is closed to seal the internal space of the housing 410. Exhaust ports 415 and 416 may be provided at a side of the housing 410 to expel an air current formed in the housing 410 to the outside.

The support plate 420 is positioned in the treatment space 412. The support plate 420 is provided in a disk shape. An upper surface of the support plate 420 is provided as a region where the wafer W is seated. A plurality of pinholes (not shown) are provided in the upper surface of the support plate 420. A lift pin (not shown) is provided in each pinhole. The lift pin (not shown) is provided to move in a vertical direction. For example, three pinholes may be positioned to be spaced apart from each other along a circumferential direction of the support plate 420.

The heaters 430 heat the wafer W on the support plate 420 to a preset temperature. A plurality of heaters 430 are positioned in different regions of the support plate 420. The heaters 430 heat different regions of the support plate 420. The regions of the support plate 420 corresponding to the heaters 430 are provided as heating zones. For example, the heaters 430 may be thermoelectric elements or hot wires.

The exhaust ports 415 and 416 are connected to the gas exhaust apparatus 500 (see FIG. 4) to be described below. The exhaust ports 415 and 416 are connected to the main exhaust lines 510: 511 and 515 of the gas exhaust apparatus 500, respectively. The exhaust ports 415 and 416 of a plurality of wafer treatment apparatuses 400 may be connected to the main exhaust lines 510: 511 and 515 of the gas exhaust apparatus 500, respectively. Although two exhaust ports 415 and 416 are shown in FIG. 4, the number of exhaust ports may increase or decrease depending on liquid types, process byproduct types, or the like and each exhaust port may be connected to the main exhaust line 510 of the gas exhaust apparatus 500.

Figure 4:
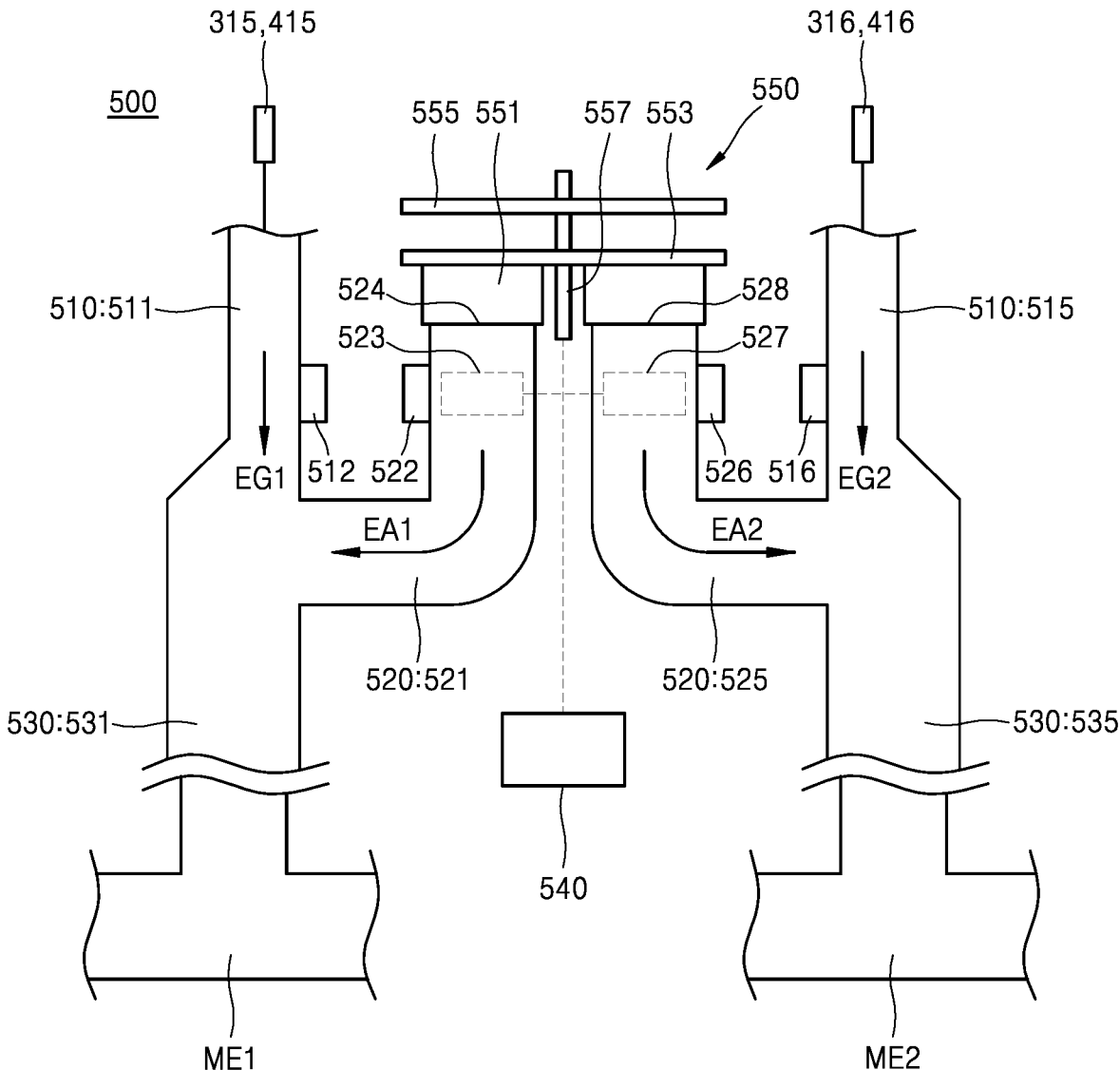
FIG. 4 is a schematic view of a gas exhaust apparatus according to an embodiment of the present invention.

FIG. 4 is a schematic view of the gas exhaust apparatus 500 according to an embodiment of the present invention.

Referring to FIG. 4, the gas exhaust apparatus 500 is provided to expel gases, process byproducts, etc. in a treatment space of the wafer treatment apparatus 300 or 400 to the outside. The gas exhaust apparatus 500 may also be used to maintain a process atmosphere in the housing 310 or 410 of the wafer treatment apparatus 300 or 400 at a constant pressure.

The gas exhaust apparatus 500 includes the main exhaust lines 510 and auxiliary exhaust lines 520. The main exhaust lines 510 include a first main exhaust line 511 and a second main exhaust line 515, and the auxiliary exhaust lines 520 include a first auxiliary exhaust line 521 and a second auxiliary exhaust line 525, but the numbers thereof may vary. The gas exhaust apparatus 500 of the present invention is characterized in that an automatic closer 550 is disposed at other ends 524 and 528 of the auxiliary exhaust lines 520.

The main exhaust lines 510 may be in a state of receiving negative pressure to suck gases EG1 and EG2 of the treatment space of the wafer treatment apparatus 300 or 400. A suction pressure means (not shown) such as a pump may be disposed at an end of an exhaust path of the gas exhaust apparatus 500 to apply negative pressure. A plurality of main exhaust lines 510: 511 and 515 may be connected to the wafer treatment apparatus 300 or 400.

Exhaust gas sensors 512 and 516 for sensing amounts of the gases EG1 and EG2 expelled from the wafer treatment apparatus 300 or 400 may be mounted on the main exhaust lines 510: 511 and 515. Exhaust gas controllers (not shown) such as shutters, valves, dampers, or fans may be mounted on the main exhaust lines 510 to adjust opening rates of the main exhaust lines 510 based on the values sensed by the exhaust gas sensors 512 and 516.

The auxiliary exhaust lines 520: 521 and 525 are provided to supply external air currents EA1 and EA2 (or external air) to the main exhaust lines 510: 511 and 515. Ends of the auxiliary exhaust lines 520 are connected to the main exhaust lines 510. An end of the first auxiliary exhaust line 521 is connected to the first main exhaust line 511, and an end of the second auxiliary exhaust line 525 is connected to the second main exhaust line 515. Other ends 524 and 528 of the auxiliary exhaust lines 520 are provided to suck the external air currents EA1 and EA2 from the inside or outside of the wafer treatment system 10. That is, the other ends 524 and 528 of the auxiliary exhaust lines 520 are provided as external air intake ports.

External exhaust lines 530 may be configured to combine the main exhaust lines 510 and the auxiliary exhaust lines 520. The external exhaust lines 530 provide passages through which the gases EG1 and EG2 introduced into the main exhaust lines 510 and the external air currents EA1 and EA2 introduced into the auxiliary exhaust lines 520 are combined and expelled to the outside. The number of external exhaust lines 530: 531 and 535 may correspond to the number of main exhaust lines 510 or auxiliary exhaust lines 520. The external exhaust lines 530: 531 and 535 may be connected to discharge lines ME1 and ME2 buried under the wafer treatment system 10 (or a semiconductor fabrication facility (FAB)).

According to an embodiment, the first and second main exhaust lines 511 and 515 may be selectively opened or closed depending on a liquid used in a wafer treatment process. For example, when acidic and alkaline liquids are used in the wafer treatment process, while the wafer W is being treated with the acidic liquid, the first main exhaust line 511 may be opened and the second main exhaust line 515 may be closed. On the contrary, while the wafer W is being treated with the alkaline liquid, the first main exhaust line 511 may be closed and the second main exhaust line 515 may be opened. The first and second auxiliary exhaust lines 521 and 525 may also be opened and closed in association with the opening and closing of the first and second main exhaust lines 511 and 515.

A controller 540 is provided to control the other elements of the gas exhaust apparatus 500. According to an embodiment, the controller 540 may adjust opening rates of the main exhaust lines 510 based on signals related to amounts of the gases EG1 and EG2, which are received from the exhaust gas sensors 512 and 516. According to an embodiment, the controller 540 may adjust opening rates of the auxiliary exhaust lines 520 based on signals related to amounts of the external air currents EA1 and EA2, which are received from external air sensors 522 and 526. According to an embodiment, the controller 540 may control operation of the automatic closer 550. The control of the gas exhaust apparatus 500 will be described in detail below.

The automatic closer 550 (or an automatic closing apparatus 550) is disposed at the other ends 524 and 528 of the auxiliary exhaust lines 520. The automatic closer 550 may be inserted and connected into the other end 524 of the first auxiliary exhaust line 521 and the other end 528 of the second auxiliary exhaust line 525 so as to be disposed at the other ends of the auxiliary exhaust lines 520. The automatic closer 550 is provided to automatically close the other ends 524 and 528 of the auxiliary exhaust lines 520 when a specific situation occurs.

Figure 5:
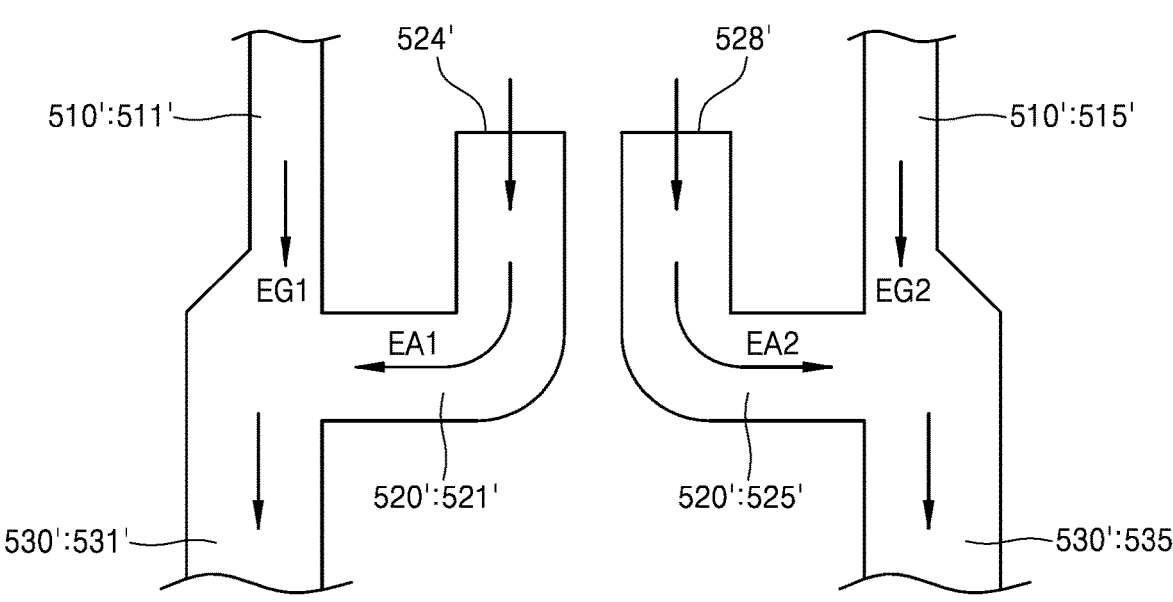
FIGS. 5 and 6 are schematic views of a gas exhaust apparatus according to a comparative example.
Figure 6:
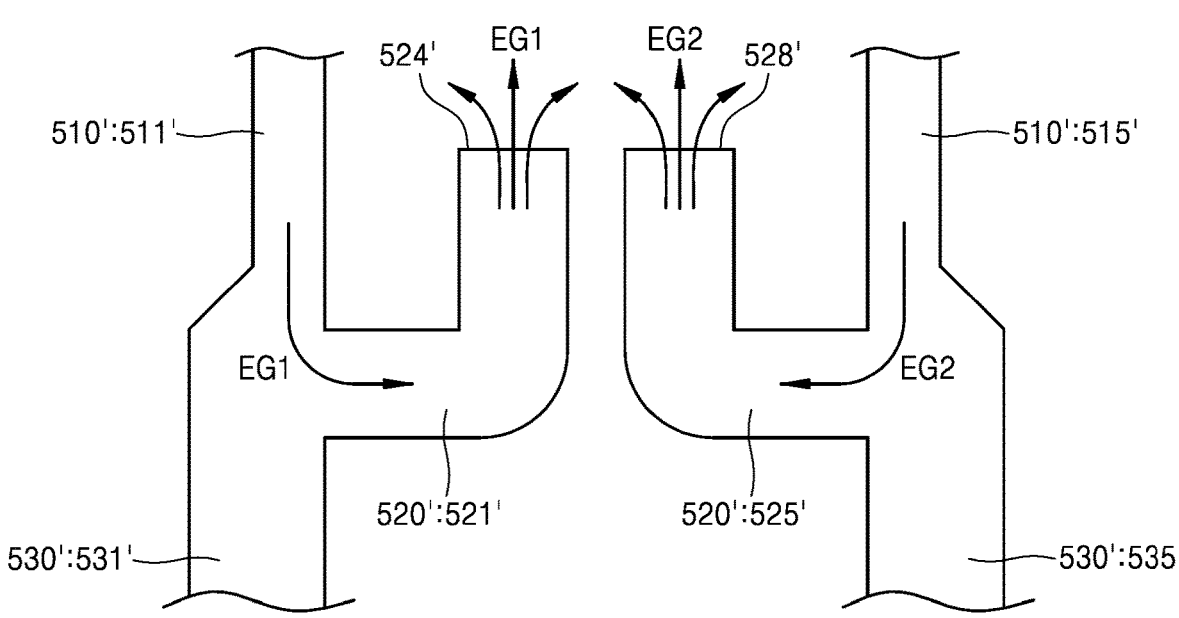

FIGS. 5 and 6 are schematic views of a gas exhaust apparatus 500' according to a comparative example. Like elements between the gas exhaust apparatus 500' according to the comparative example and the gas exhaust apparatus 500 of the present invention are denoted by like reference numerals, and are not repeatedly described herein.

Referring to FIG. 5, the gas exhaust apparatus 500' according to the comparative example includes main exhaust lines 510' and auxiliary exhaust lines 520'. The main exhaust lines 510' are connected to ends of the auxiliary exhaust lines 520', and other ends 524' and 528' of the auxiliary exhaust lines 520' are open. The external air currents EA1 and EA2 are sucked into the other ends 524' and 528' of the auxiliary exhaust lines 520'.

External exhaust lines 530' are configured to combine the main exhaust lines 510' and the auxiliary exhaust lines 520' and provide passages through which the gases EG1 and EG2 and the external air currents EA1 and EA2 are combined and expelled to the outside.

A suction pressure means (not shown) may be disposed at an end of an exhaust path of the gas exhaust apparatus 500' to apply negative pressure. As such, the gases EG1 and EG2 and the external air currents EA1 and EA2 move toward the external exhaust lines 530' and are expelled to the outside. The direction and the expulsion of the gases EG1 and EG2 and the external air currents EA1 and EA2 may be controlled throughout a process by the suction pressure means (not shown) and a gas flow rate control means (not shown) mounted on each exhaust line.

However, when a specific or emergency situation occurs, the gases EG1 and EG2 and the external air currents EA1 and EA2 may move differently. The specific or emergency situation includes a situation in which power is cut off to various devices, a situation in which a cable is short-circuited, a situation in which a control system has an error, a situation in which a device is broken, or the like. For example, the specific or emergency situation may include a situation in which power is cut off to any one of the wafer treatment system 10, the wafer treatment apparatus 300 or 400, and the gas exhaust apparatus 500' such that the gases EG1 and EG2 and the external air currents EA1 and EA2 are not expelled toward the external exhaust lines 530'.

Referring to FIG. 6, when the above-described specific or emergency situation occurs, the elements of the gas exhaust apparatus 500' stop operating. Because suction pressure is not applied in the gas exhaust apparatus 500', the external air currents EA1 and EA2 are not introduced into the other ends 524' and 528' of the auxiliary exhaust lines 520'. Meanwhile, the gases EG1 and EG2 already expelled from the wafer treatment apparatus 300 or 400 immediately before the specific situation occurs may remain in the main exhaust lines 510'. When the specific or emergency situation occurs, the gases EG1 and EG2 may leak in a backward direction through the other ends 524' and 528' of the auxiliary exhaust lines 520'.

From a different point of view, the specific or emergency situation may be a situation in which the gases EG1 and EG2 to be expelled through the main exhaust lines 510' to the outside leak through the other ends 524' and 528' of the auxiliary exhaust lines 520'. Because the gases EG1 and EG2 include toxic gases, particulates, etc., when they leak through the auxiliary exhaust lines 520', serious problems such as adsorption of foreign substances onto an external system, deterioration of the system surface, contamination of an atmosphere of the external system, and damage of a user's health may be caused.

Therefore, the present invention is characterized in that the automatic closer 550 (or the automatic closing apparatus 550) is disposed at the other ends 524 and 528 of the auxiliary exhaust lines 520 to automatically close the other ends 524 and 528 of the auxiliary exhaust lines 520 when a specific situation occurs.

Figure 7:
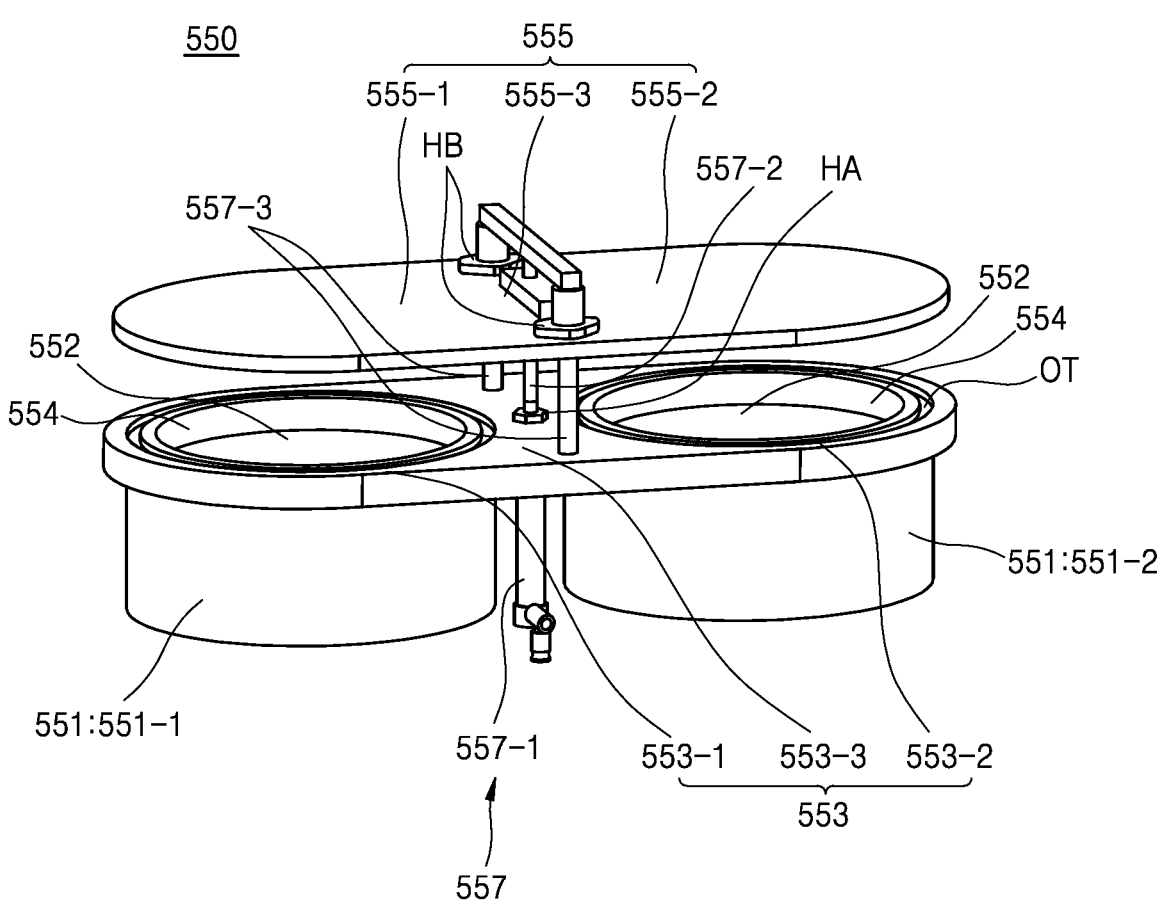
FIG. 7 is a perspective view of an automatic closer according to an embodiment of the present invention.

FIG. 7 is a perspective view of the automatic closer 550 (or the automatic closing apparatus 550) according to an embodiment of the present invention.

Referring to FIG. 7, the automatic closer 550 includes bodies 551, a sealer 553, a cover 555, and a driver 557.

The bodies 551 may be connected to the auxiliary exhaust lines 520. The bodies 551 may have openings 552. When the bodies 551 are connected to the auxiliary exhaust lines 520, the openings 552 may be connected to internal passages of the auxiliary exhaust lines 520 and used as inlet passages for the external air currents EA1 and EA2. The bodies 551 may have an inner diameter corresponding to an outer diameter of the auxiliary exhaust lines 520, so as to be fitted into the auxiliary exhaust lines 520. The bodies 551 may be provided in a cylindrical shape overall, or provided in another shape as long as they may be connected to the auxiliary exhaust lines 520.

The automatic closer 550 may include one or more bodies 551. The automatic closer 550 includes two bodies 551: 551-1 and 551-2 based on the number of auxiliary exhaust lines 520: 521 and 525 herein, but is not limited thereto.

The sealer 553 is connected onto the bodies 551. Overall, the sealer 553 has a plate shape extending in a plane including the first and second directions 12 and 14 (i.e., an xy plane). The sealer 553 has hollow parts 554 to correspond to the openings 552 of the bodies 551. The bodies 551 may be integrally connected to the sealer 553, and the openings 552 and the hollow parts 554 may be connected to each other and used as inlet passages for the external air currents EA1 and EA2.

The sealer 553 includes first and second sealing parts 553-1 and 553-2 directly connected onto the bodies 551: 551-1 and 551-2. The sealer 553 further includes a third sealing part 553-3 connecting the first and second sealing parts 553-1 and 553-2. A through hole HA of the third sealing part 553-3 is provided to accommodate a driving shaft 557-2 of the driver 557. The sealer 553 is connected onto the bodies 551: 551-1 and 551-2, and thus may serve to integrally connect a plurality of bodies 551: 551-1 and 551-2.

O-ring grooves OT may be further provided in the first and second sealing parts 553-1 and 553-2 of the sealer 553. The O-ring grooves OT may be provided in an upper surface of the sealer 553 around the hollow parts 554 to a certain depth. O-rings (not shown) may be inserted into the O-ring grooves OT.

The cover 555 may be mounted to be vertically movable on the sealer 553. The cover 555 have a plate shape overall to correspond to the size and shape of the sealer 553. The cover 555 may be positioned to be vertically spaced apart from the sealer 553 by the driver 557.

The cover 555 includes first and second cover parts 555-1 and 555-2 facing the first and second sealing parts 553-1 and 553-2. The cover 555 further includes a third cover part 555-3 connecting the first and second cover parts 555-1 and 555-2. Support holes HB of the third cover part 555-3 are provided to accommodate support shafts 557-3 of the driver 557.

The cover 555 may contact the upper surface of the sealer 553 when it moves to a lower limit. In this case, the cover 555 may close the hollow parts 554 of the sealer 553 and the openings 552 of the bodies 551. The cover 555 has a wide plate shape corresponding to the sealer 553, and thus may simultaneously open or close the openings 552 of a plurality of bodies 551: 551-1 and 551-2. The O-rings (not shown) inserted into the O-ring grooves OT of the sealer 553 may more tightly seal between the sealer 553 and the cover 555. Meanwhile, instead of the O-rings/O-ring grooves OT, various means for sealing between the sealer 553 and the cover 555 in contact may be used without limitation. Alternatively, O-rings/O-ring grooves may be provided in the cover 555 to seal between the cover 555 and the sealer 553.

The driver 557 is provided to be connected to the cover 555 to vertically drive the cover 555. The driver 557 includes a power unit 557-1, the driving shaft 557-2, and the support shafts 557-3.

The power unit 557-1 provides a driving force to stretch or vertically drive the driving shaft 557-2. An upper portion of the driving shaft 557-2 may be connected to the cover 555 to vertically drive the cover 555 by using the driving force received from the power unit 557-1. For example, the driving shaft 557-2 may be connected to the cover 555 by passing through the through hole HA of the sealer 553. As another example, the driving shaft 557-2 may be connected to the cover 555 by bypassing the sealer 553. The power unit 557-1 and the driving shaft 557-2 may use a means such as a cylinder or a motor. One driver 557 or driving shaft 557-2 may be connected to the cover 555, and the cover 555 may simultaneously open or close the openings 552 of a plurality of bodies 551: 551-1 and 551-2, thereby minimizing the configuration of the driver 557.

The support shafts 557-3 may be mounted on the sealer 553 and lower ends thereof may be fixed. Upper ends of the support shafts 557-3 may pass through the support holes HB of the cover 555. The cover 555 may vertically move in a vertical space formed by the support shafts 557-3. The support shafts 557-3 may guide a vertical path of the cover 555.

Figure 8:
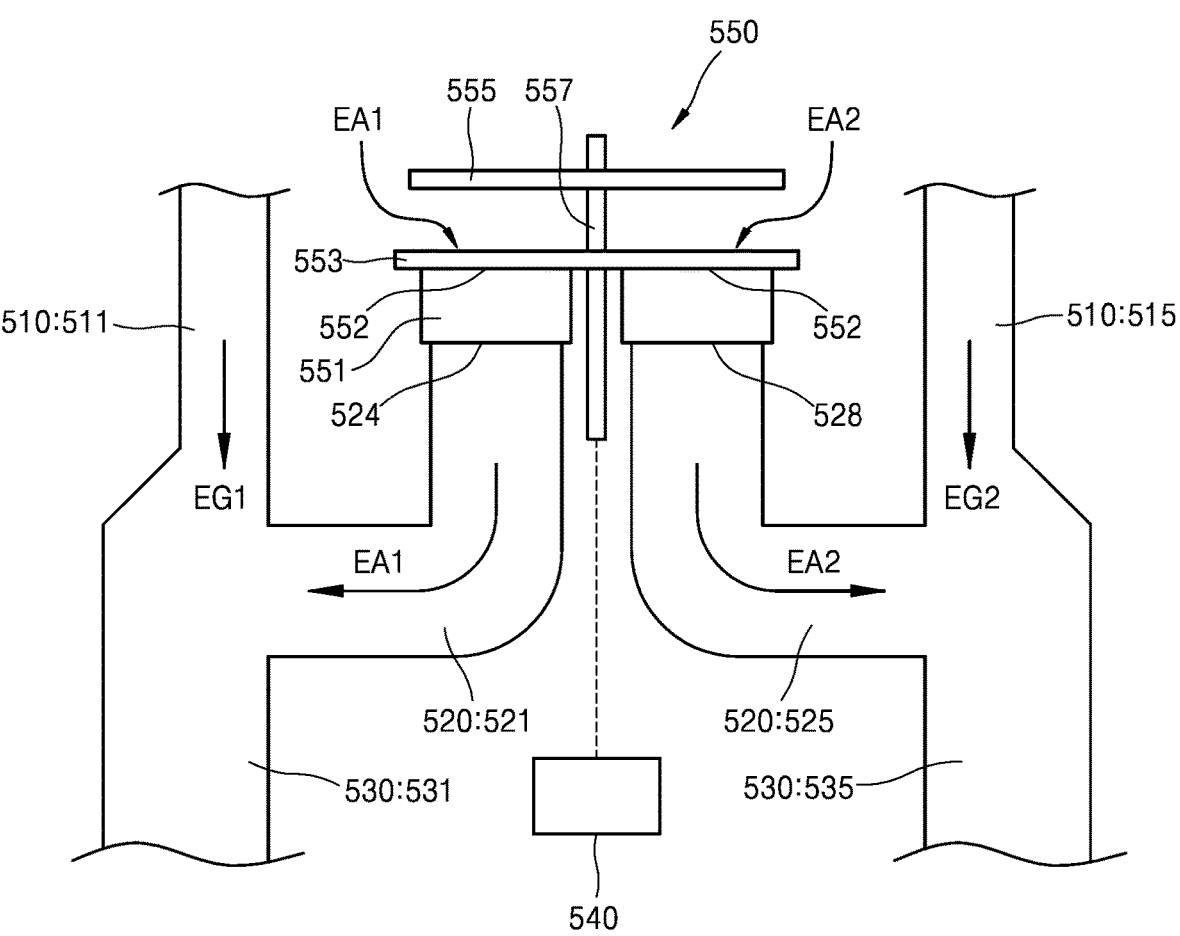
FIGS. 8 and 9 are schematic views showing operation of a gas exhaust apparatus according to an embodiment of the present invention.
Figure 9:
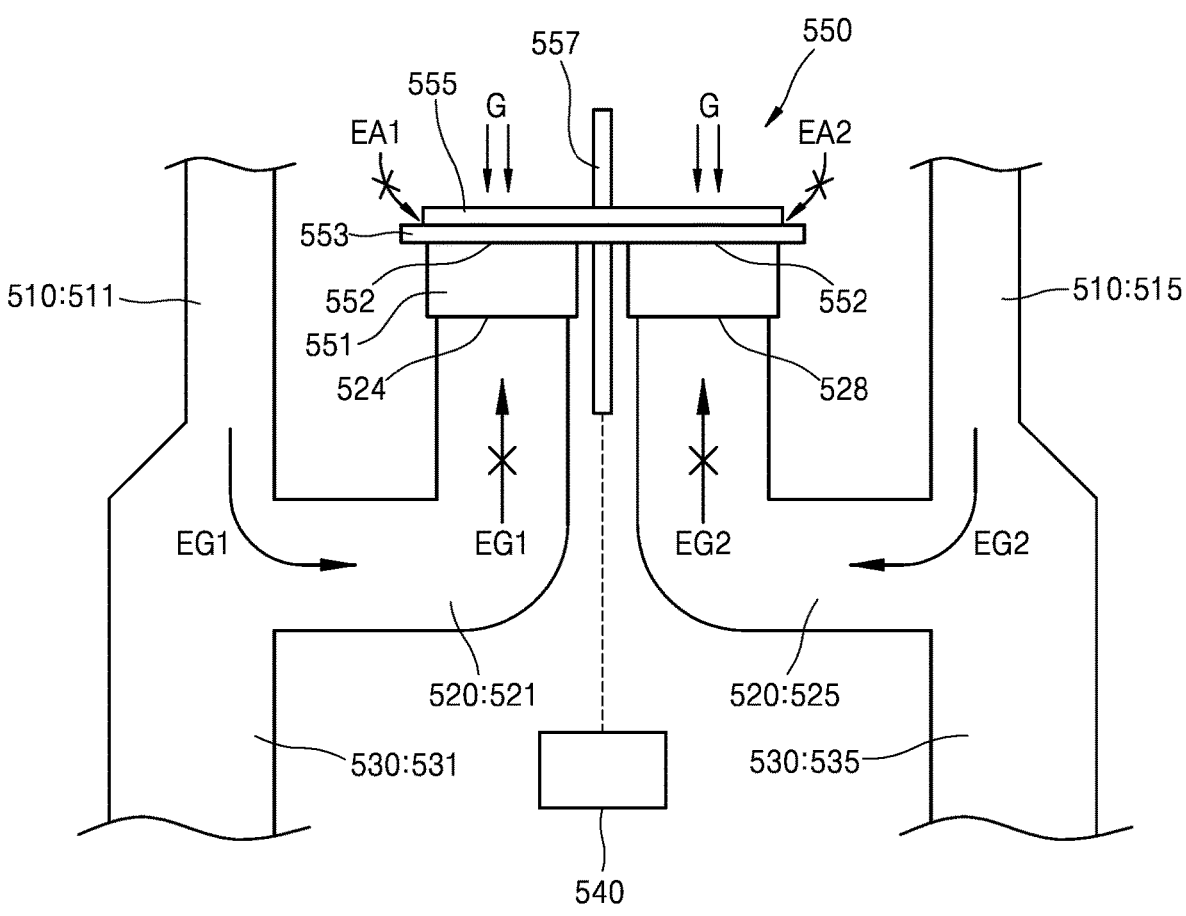

FIGS. 8 and 9 are schematic views showing operation of the gas exhaust apparatus 500 according to an embodiment of the present invention. FIG. 8 shows operation in a normal process, and FIG. 9 shows operation when a specific or emergency situation occurs.

Referring to FIG. 8, the gases EG1 and EG2 expelled from the wafer treatment apparatus 300 or 400 move through the main exhaust lines 510, and the external air currents EA1 and EA2 move through the auxiliary exhaust lines 520. Because the cover 555 of the automatic closer 550 is spaced apart from the sealer 553, the external air currents EA1 and EA2 may be introduced through the openings 552 of the bodies 551 into the auxiliary exhaust lines 520. The gases EG1 and EG2 and the external air currents EA1 and EA2 may be combined and moved to the external exhaust lines 530 and expelled to an external exhaust apparatus. The controller 540 controls the exhaust gas sensors 512 and 516 of the main exhaust lines 510, the external air sensors 522 and 526 of the auxiliary exhaust lines 520, and a flow rate control means (not shown) mounted on each exhaust line. In addition, the controller 540 may control the driver 557 of the automatic closer 550 in such a manner that the cover 555 and the sealer 553 are spaced apart from each other. The controller 540 may also control a distance between the cover 555 and the sealer 553 to adjust amounts of the external air currents EA1 and EA2 introduced through the openings 552.

Referring to FIG. 9, when a specific or emergency situation occurs, the automatic closer 550 closes the other ends 524 and 528 of the auxiliary exhaust lines 520. When a situation in which power is cut off to various devices, a situation in which a cable is short-circuited, a situation in which a control system has an error, a situation in which a device is broken, or the like occurs, the gases EG1 and EG2 should not leak through the openings 552.

For example, even when a situation in which power is cut off to the automatic closer 550 occurs as the specific or emergency situation, the cover 555 of the automatic closer 550 may move downward (as indicated by "G") to contact the sealer 553. When the driver 557 transmits no driving force to the cover 555, the cover 555 may fall by its own weight. When the cover 555 falls, the support shafts 557-3 guide a falling path of the cover 555.

When the cover 555 falls by its own weight to contact the sealer 553, the O-rings may more tightly seal the openings 552. As such, the gases EG1 and EG2 remaining in the main exhaust lines 510 and the auxiliary exhaust lines 520 are blocked by the cover 555 so as not to leak through the other ends 524 and 528 of the auxiliary exhaust lines 520. In addition, the external air currents EA1 and EA2 are blocked by the cover 555 so as not to be introduced though the other ends 524 and 528 of the auxiliary exhaust lines 520.

As another example, even in the specific situation, when the controller 540 and the automatic closer 550 are operable, the controller 540 may drive the driver 557 in such a manner that the cover 555 moves downward.

Meanwhile, referring back to FIG. 4, the external air sensors 522 and 526 for sensing introduced amounts of the external air currents EA1 and EA2 may be mounted near the other ends 524 and 528 of the auxiliary exhaust lines 520. When it is determined that the amounts of the external air currents EA1 and EA2 introduced into the auxiliary exhaust lines 520, which are sensed by the external air sensors 522 and 526, are zero or less than a preset amount, the controller 540 may drive the driver 557 in such a manner that the cover 555 closes the openings 552. When a specific element of the gas exhaust apparatus 500 does not function properly, the amounts of the external air currents EA1 and EA2 normally introduced into the auxiliary exhaust lines 520 may be changed. Therefore, when the amounts of the external air currents EA1 and EA2 introduced into the auxiliary exhaust lines 520, which are sensed by the external air sensors 522 and 526, are zero or less than the preset amount, the controller 540 may determine it as the specific situation and provide control to automatically close the openings 552.

Figure 10:
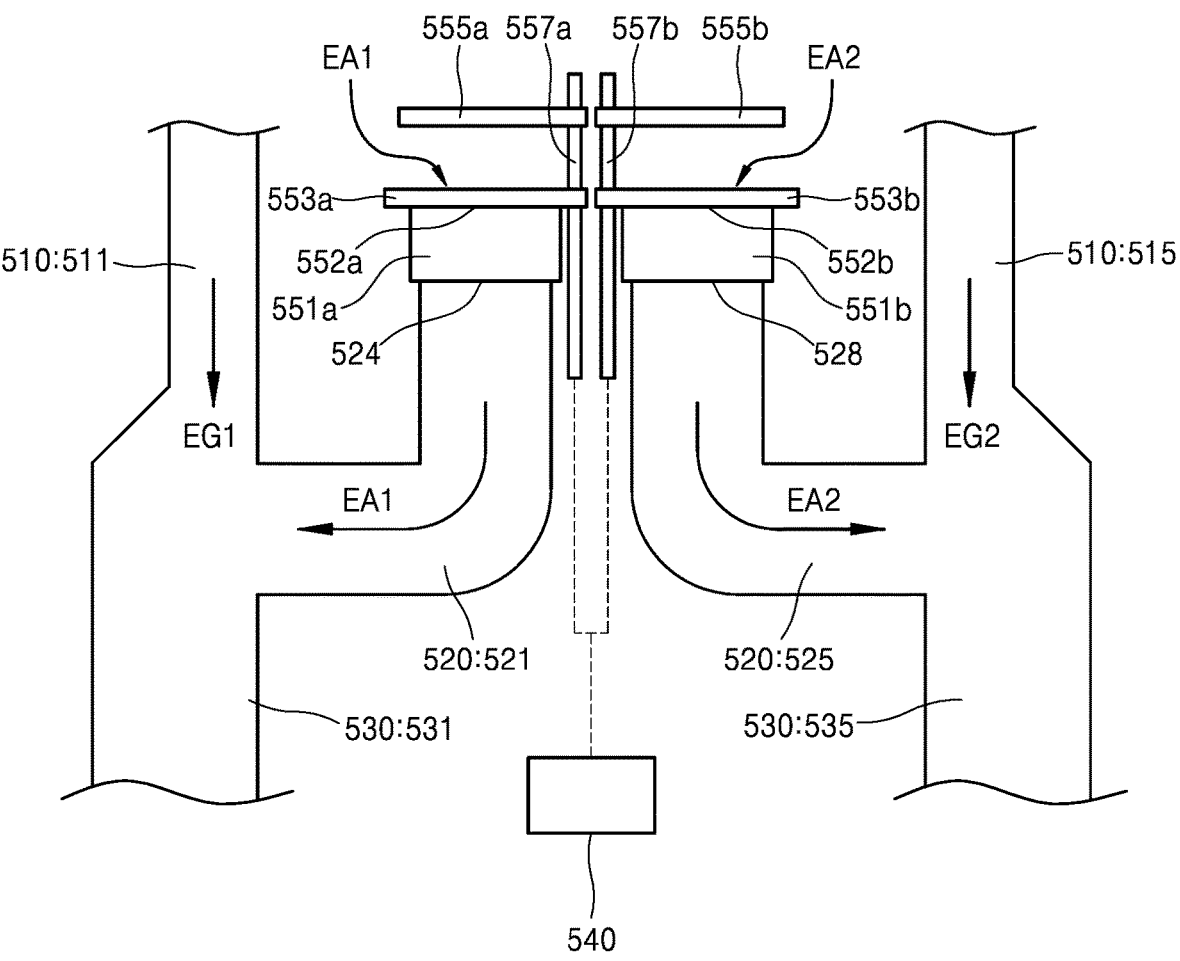
FIGS. 10 to 12 are schematic views of gas exhaust apparatuses according to various embodiments of the present invention.
Figure 11:
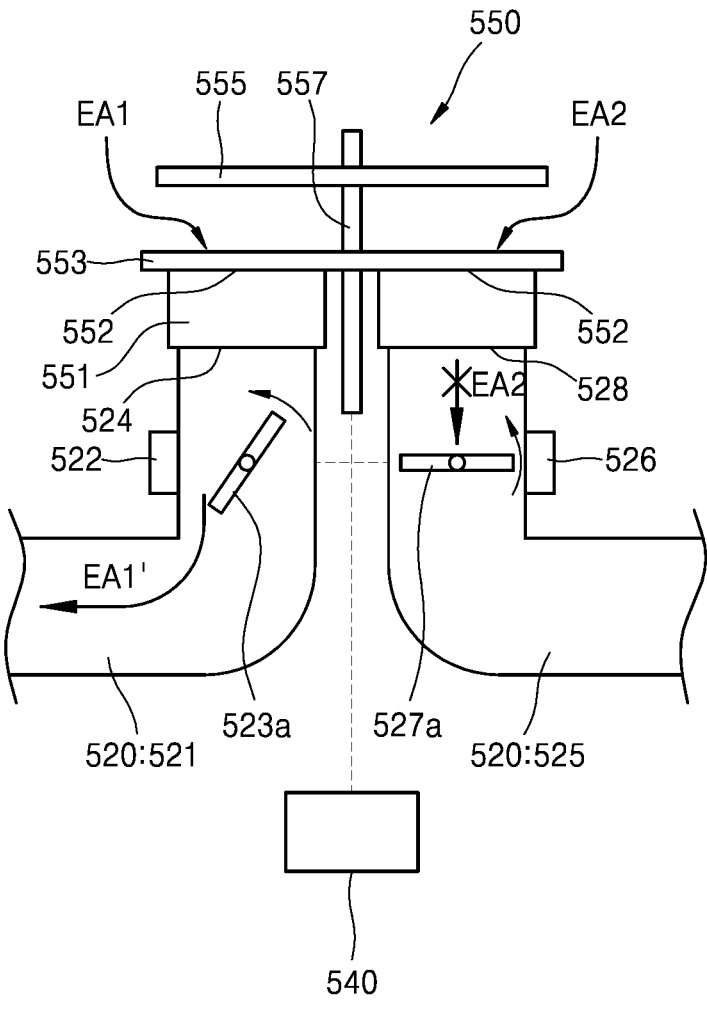
Figure 12:
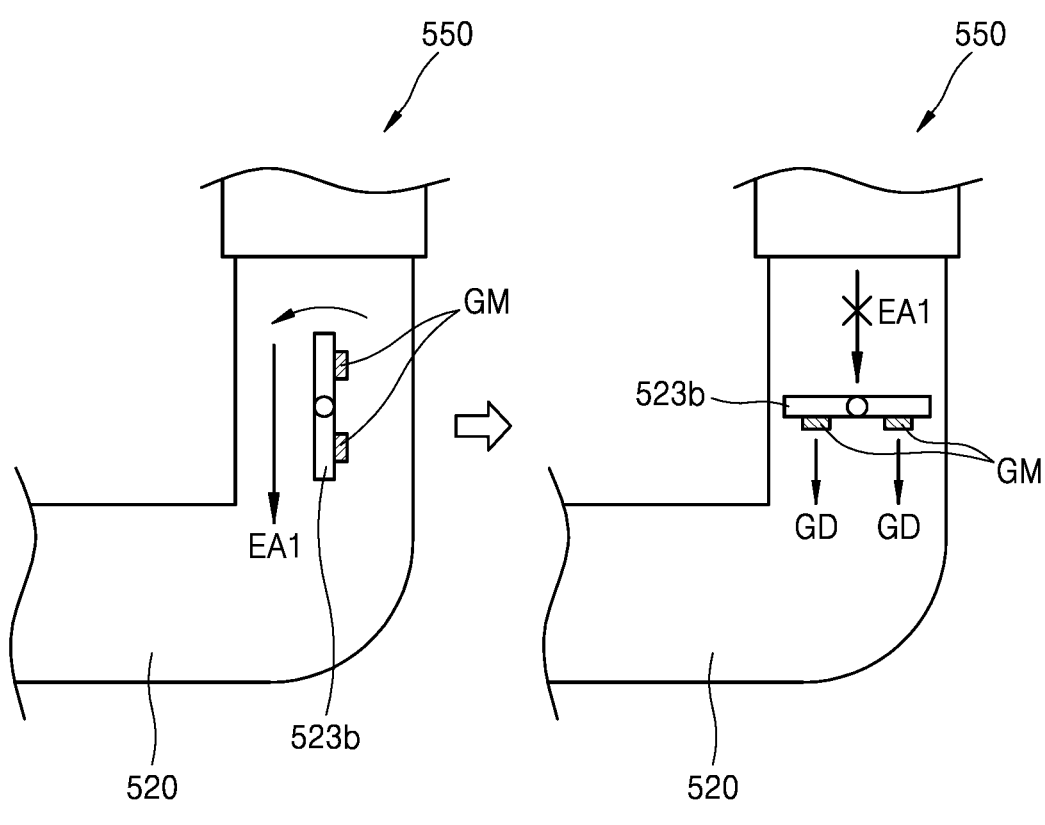

FIGS. 10 to 12 are schematic views of gas exhaust apparatuses according to various embodiments of the present invention.

Referring to FIG. 10, the automatic closer 550 according to an embodiment may be configured to control openings 552*a* and 552*b* independently. Two automatic closers 550*a* and 550*b* are connected to the auxiliary exhaust lines 520: 521 and 525, respectively. Each automatic closer 550*a* or 550*b* includes one body 551*a* or 551*b*, and also includes a sealer 553*a* or 553*b*, a cover 555*a* or 555*b*, and one driver 557*a* or 557*b* connected to the body 551*a* or 551*b*.

The automatic closers 550*a* and 550*b* may close the openings 552*a* and 552*b* in a specific or emergency situation as described above in relation to FIG. 9. In a normal process, the automatic closers 550*a* and 550*b* may adjust amounts of the external air currents EA1 and EA2 introduced through the openings 552*a* and 552*b*, respectively.

Referring to FIG. 11, the gas exhaust apparatus 500 according to an embodiment may further include air current controllers 523*a* and 527*a* mounted in the auxiliary exhaust lines 520: 521 and 525. The air current controllers 523*a* and 527*a* may be shutters, valves, dampers, or fans capable of adjusting opening rates of the auxiliary exhaust lines 520. For example, when the air current controllers 523*a* and 527*a* are shutters, each shutter may be provided to be rotatable about a central axis, and the opening rate of the auxiliary exhaust line 520 may be adjusted and the introduced amount of the external air current may also be adjusted (e.g., EA1→EA1') based on the rotation of the shutter.

The controller 540 may close the auxiliary exhaust lines 520 by controlling the air current controllers 523*a* and 527*a*, without sealing the openings 552 by driving the cover 555 of the automatic closer 550. The controller 540 may prevent the external air current EA2 from being introduced, by controlling the air current controller 527*a* to be oriented to block the auxiliary exhaust line 520. When the auxiliary exhaust line 520 is closed by the air current controller 527*a*, the gas EG2 may also be prevented from leaking in a backward direction.

Referring to FIG. 12, masses GM may be connected to an air current controller 523*b* according to an embodiment. The masses GM may have weights sufficient to change orientation of the air current controller 523*b*. Even when the air current controller 523*b* is not controlled in a specific or emergency situation, the masses GM face downward GD by their own weights. As such, the air current controller 523*b* may be oriented to block the auxiliary exhaust line 520, and the external air current EA2 may not be introduced. When the auxiliary exhaust line 520 is closed by the air current controller 523*b*, the gas EG1 may also be prevented from leaking in a backward direction.

As described above, according to an embodiment of the present invention, when an emergency situation occurs, leakage of process byproduct gases through intake ports may be prevented.

Furthermore, according to an embodiment of the present invention, when an emergency situation occurs, intake lines may be automatically closed without additional control.

In addition, according to an embodiment of the present invention, systems and users outside a wafer treatment apparatus may be protected by preventing leakage of process byproduct gases.

However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. An automatic closing apparatus for closing an intake line in a specific situation, the automatic closing apparatus comprises:
   a body connected to the intake line and having an opening;
   a sealer connected onto the body and having a hollow part;
   a cover mounted to be vertically movable on the sealer to open or close the opening; and
   a driver connected to the cover to vertically drive the cover,
   wherein the driver comprises:
   a power unit providing a driving force for vertical driving of the cover;
   a driving shaft connected to the cover to vertically drive the cover; and
   a plurality of support shafts mounted on the sealer to pass through support holes of the cover,
   wherein the specific situation comprises a situation in which power supply to the automatic closing apparatus is cut off, and
   wherein, in the specific situation, the cover falls by its own weight to close the opening.

2. The automatic closing apparatus of claim 1,
   wherein the body is provided in plural so that the automatic closing apparatus comprises a plurality of bodies,
   wherein the plurality of bodies have a plurality of openings,
   wherein the sealer is provided on the plurality of bodies to integrally connect the plurality of bodies, and
   wherein the cover is provided to simultaneously open or close the plurality of openings of the plurality of bodies.

3. The automatic closing apparatus of claim 1, further comprising:

an O-ring groove disposed at a side surface of the sealer facing the cover.

4. A gas exhaust apparatus for expelling a gas in a treatment space of a wafer treatment apparatus to outside, the gas exhaust apparatus comprising:

a main exhaust line connected to the treatment space;

an auxiliary exhaust line having a first end connected to the main exhaust line to supply an external air current to the main exhaust line; and an automatic closer disposed at a second end of the auxiliary exhaust line, opposite to the first end, wherein the automatic closer includes:

a body connected to the auxiliary exhaust line and having an opening;

a sealer connected onto the body and having a hollow part;

a cover mounted to be vertically movable on the sealer to open or close the opening; and a driver connected to the cover to vertically drive the cover, and wherein, in a situation in which power supply to the automatic closer is cut off, to prevent the gas to be expelled through the main exhaust line to the outside from leaking through the second end of the auxiliary exhaust line, the cover falls by its own weight to close the opening so as to close the second end of the auxiliary exhaust line.

5. A gas exhaust apparatus for expelling a gas in a treatment space of a wafer treatment apparatus to outside, the gas exhaust apparatus comprising:

a main exhaust line connected to the treatment space;

an auxiliary exhaust line having a first end connected to the main exhaust line to supply an external air current to the main exhaust line; and an automatic closer connected to a second end, opposite to the first end, of the auxiliary exhaust line and configured to close the second end of the auxiliary exhaust line in a specific situation, wherein the automatic closer comprises:

a body connected to the auxiliary exhaust line and having an opening;

a sealer connected onto the body and having a hollow part;

a cover mounted to be vertically movable on the sealer to open or close the opening; and a driver connected to the cover to vertically drive the cover, wherein the specific situation comprises a situation in which power supply to the automatic closer is cut off, and wherein, in the specific situation, the cover falls by its own weight to close the opening.

6. A gas exhaust apparatus for expelling a gas in a treatment space of a wafer treatment apparatus to outside, the gas exhaust apparatus comprising:

a main exhaust line connected to the treatment space;

an auxiliary exhaust line having a first end connected to the main exhaust line to supply an external air current to the main exhaust line; and an automatic closer connected to a second end, opposite to the first end, of the auxiliary exhaust line and configured to close the second end of the auxiliary exhaust line in a specific situation, wherein the automatic closer comprises:

a body connected to the auxiliary exhaust line and having an opening;

a sealer connected onto the body and having a hollow part;

a cover mounted to be vertically movable on the sealer to open or close the opening; and a driver connected to the cover to vertically drive the cover, wherein the automatic closer comprises a plurality of bodies, wherein the plurality of bodies have a plurality of openings, and wherein the sealer is provided on the plurality of bodies to integrally connect the plurality of bodies.

7. The gas exhaust apparatus of claim 6, wherein the specific situation comprises a situation in which the gas to be expelled through the main exhaust line to the outside leaks through the second end of the auxiliary exhaust line.

8. The gas exhaust apparatus of claim 6, wherein the cover is provided to simultaneously open or close the plurality of openings of the plurality of bodies.

9. The gas exhaust apparatus of claim 6, wherein an O-ring groove is provided in a side surface of the sealer facing the cover.

10. The gas exhaust apparatus of claim 6, wherein the opening and the hollow part are connected to each other.

11. The gas exhaust apparatus of claim 6, further comprising:

an air current controller mounted in the auxiliary exhaust line and configured to control an amount of an air current flowing through the auxiliary exhaust line.

12. The gas exhaust apparatus of claim 11, further comprising:

a mass connected to the air current controller, wherein, in the specific situation, the air current controller is oriented to block the auxiliary exhaust line by a weight of the mass.

13. A gas exhaust apparatus for expelling a gas in a treatment space of a wafer treatment apparatus to outside, the gas exhaust apparatus comprising:

a main exhaust line connected to the treatment space;

an auxiliary exhaust line having a first end connected to the main exhaust line to supply an external air current to the main exhaust line; and an automatic closer connected to a second end, opposite to the first end, of the auxiliary exhaust line and configured to close the second end of the auxiliary exhaust line in a specific situation, wherein the automatic closer comprises:

a body connected to the auxiliary exhaust line and having an opening;

a sealer connected onto the body and having a hollow part;

a cover mounted to be vertically movable on the sealer to open or close the opening; and a driver connected to the cover to vertically drive the cover, and wherein the driver comprises:

a power unit providing a driving force for vertical driving of the cover;

a driving shaft connected to the cover to vertically drive the cover; and support shafts mounted on the sealer to pass through support holes of the cover.

14. The gas exhaust apparatus of claim 13, further comprising:

an external air sensor mounted on the auxiliary exhaust line and configured to sense an amount of the external air current introduced into the auxiliary exhaust line.

15. The gas exhaust apparatus of claim 14, wherein, when the amount of the external air current introduced into the auxiliary exhaust line, which is sensed by the external air sensor, is zero or less than a preset amount, the cover closes the opening.

\*  \*  \*  \*  \*